United States Patent
Lee et al.

(10) Patent No.: US 12,401,417 B2
(45) Date of Patent: Aug. 26, 2025

(54) METHOD AND APPARATUS FOR NETWORK SYNCHRONIZATION IN SATELLITE COMMUNICATION SYSTEM

(71) Applicant: Electronics and Telecommunications Research Institute, Daejeon (KR)

(72) Inventors: In Ki Lee, Daejeon (KR); Joon Gyu Ryu, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 314 days.

(21) Appl. No.: 18/300,214

(22) Filed: Apr. 13, 2023

(65) Prior Publication Data

US 2023/0336243 A1    Oct. 19, 2023

(30) Foreign Application Priority Data

Apr. 13, 2022 (KR) .......... 10-2022-0045941

(51) Int. Cl.
*H04W 56/00* (2009.01)
*H04B 7/185* (2006.01)
*H04W 84/06* (2009.01)

(52) U.S. Cl.
CPC .... *H04B 7/18589* (2013.01); *H04W 56/0015* (2013.01); *H04W 84/06* (2013.01)

(58) Field of Classification Search
CPC ............ H04B 7/18589; H04B 7/2125; H04W 56/0015; H04W 84/06
USPC ........................................................ 370/329
See application file for complete search history.

(56) References Cited

U.S. PATENT DOCUMENTS

| | | | | |
|---|---|---|---|---|
| 5,930,262 A | * | 7/1999 | Sierens | H04J 3/1694 370/442 |
| 6,501,743 B1 | * | 12/2002 | Kim | H04B 7/2125 370/324 |
| 9,692,527 B2 | | 6/2017 | Ryu | |
| 10,411,790 B2 | | 9/2019 | Hong et al. | |
| 2002/0089946 A1 | * | 7/2002 | Hutchings | H04B 7/2125 370/278 |
| 2012/0099521 A1 | | 4/2012 | Ryu et al. | |

(Continued)

FOREIGN PATENT DOCUMENTS

KR   10-2012-0042354   5/2012
KR   10-2016-0100534   8/2016

(Continued)

OTHER PUBLICATIONS

Jeon et al., "NCR clock recovery method suitable for DVB-S2/RCS2 systems", ICTC, 2014, pp. 995-996.

Primary Examiner — Robert J Lopata
(74) Attorney, Agent, or Firm — KILE PARK REED & HOUTTEMAN PLLC (57) ABSTRACT

A method and an apparatus for network synchronization in a satellite communication system is provided. a satellite station receives a superframe start timing (SST) and an initial counter value from a center station, and receives traffic information sent from a terminal station at a time determined based on the SST. Then, the satellite station generates a compensation value for the SST upon receiving the traffic information, and corrects the SST in accordance with the compensation value.

15 Claims, 5 Drawing Sheets

(56) References Cited

U.S. PATENT DOCUMENTS

| | | | |
|---|---|---|---|
| 2013/0315137 A1* | 11/2013 | Bhaskar | H04B 7/18513 370/324 |
| 2016/0242136 A1* | 8/2016 | Jung | H04W 56/0045 |
| 2017/0141855 A1* | 5/2017 | Ryu | H04B 7/18519 |
| 2018/0139711 A1* | 5/2018 | Ryu | H04W 56/004 |
| 2019/0281564 A1 | 9/2019 | Yang et al. | |
| 2020/0059296 A1* | 2/2020 | Regunathan | H04L 45/121 |
| 2020/0084736 A1* | 3/2020 | Regunathan | H04B 7/0695 |
| 2020/0343970 A1* | 10/2020 | Kim | H04B 7/2048 |

FOREIGN PATENT DOCUMENTS

| | | |
|---|---|---|
| KR | 10-2018-0053205 | 5/2018 |
| KR | 10-2018-0055655 | 5/2018 |
| KR | 10-2199453 | 1/2021 |
| KR | 10-2208677 | 1/2021 |
| KR | 10-2021-0114762 | 9/2021 |

* cited by examiner

METHOD AND APPARATUS FOR NETWORK SYNCHRONIZATION IN SATELLITE COMMUNICATION SYSTEM

CROSS-REFERENCE TO RELATED APPLICATION

The present application is based on and claims the benefit of priority to Korean Patent Application Number 10-2022-0045941, filed on Apr. 13, 2022, in the Korean Intellectual Property Office, the entire disclosure of which is incorporated herein by reference.

TECHNICAL FIELD

The present disclosure relates to network synchronization, and more particularly, to a method and apparatus for network synchronization in a satellite communication system.

BACKGROUND

In general, a satellite communication network includes a satellite station, a center station, and a plurality of terminal stations. For bidirectional satellite communication, Digital Video Broadcasting-Satellite-Second Generation (DVB-S2)-based time division multiplexing (TDM) forward link is used in a direction from center station to terminal station, and a digital video broadcasting-return channel by satellite (DVB-RCS)-based Multi Frequency-Time Division Multiple Access (MF-TDMA) return link transmission scheme is used.

DVB-RCS2 is sent and received based on MF-TDMA, and a center station/terminal on the ground and a satellite station need to achieve accurate time synchronization in order for a satellite and a ground station to perform accurate communication.

SUMMARY

In view of the above, the present disclosure provides a method and apparatus for network synchronization that enable accurate time synchronization in a very small aperture terminal (VSAT) satellite communication system using a satellite that supports a digital signal processing function.

According to an exemplary embodiment of the present disclosure, there is provided a method for network synchronization in a satellite communication system, the method including: receiving, by a satellite station, a superframe start timing (SST) and an initial counter value from a center station; receiving, by the satellite station, traffic information sent from a terminal station at a time determined based on the SST; and generating, by the satellite station, a compensation value for the SST upon receiving the traffic information, and correcting the SST in accordance with the compensation value.

In one implementation, the correcting of the SST may include obtaining the compensation value by using a timing offset corresponding to the received traffic information and a preset HGT (half guard time).

In one implementation, the correcting of the SST may include: estimating a timing offset corresponding to the received traffic information; obtaining the compensation value by subtracting a preset HGT from the estimated timing offset; and correcting the SST in accordance with the compensation value.

In one implementation, the correcting of the SST in accordance with the compensation value may include obtaining a corrected SST by adding the compensation value and SFDtick to the SST, wherein SFDtick is a superframe duration clock tick.

In one implementation, the method may further include sending, by the satellite station, the corrected SST to the center station.

In one implementation, the method may further include receiving, by the satellite station, traffic information from the terminal station in accordance with a value counted from the initial counter value and the corrected SST.

In one implementation, the satellite station may periodically set an initial clock counter value.

In one implementation, a stamping cycle may be determined in accordance with the specification of a data processing equipment (DPE) clock of the center station, and the initial clock counter value may be periodically set in accordance with the stamping cycle.

In one implementation, the traffic information may be sent from the terminal station at a transmission time determined by using timing error information, which the terminal station receives from the center station, and the SST.

In one implementation, the satellite system may be a multi frequency-time division multiple access (TDMA)-based very small aperture terminal (VSAT) satellite communication system.

Another exemplary embodiment of the present disclosure provides a satellite apparatus in a satellite communication system, including: a network interface device; and a processor, wherein the processor is configured to perform: an operation of receiving a superframe start timing (SST) and an initial counter value from a center station through the network interface device; an operation of receiving traffic information sent from a terminal station at a time determined based on the SST through the network interface device; and generating a compensation value for the SST upon receiving the traffic information, and correcting the SST in accordance with the compensation value.

In one implementation, in performing the operation of correcting the SST, the processor may be configured to obtain the compensation value by using a timing offset corresponding to the received traffic information and a preset HGT (half guard time).

In one implementation, in performing the operation of correcting the SST, the processor may be configured to perform: an operation of estimating a timing offset corresponding to the received traffic information; an operation of obtaining the compensation value by subtracting a preset HGT from the estimated timing offset; and an operation of correcting the SST in accordance with the compensation value.

In one implementation, a corrected SST may be obtained by adding the compensation value and SFDtick to the SST, wherein SFDtick is a superframe duration clock tick.

In one implementation, the processor may be configured to additionally perform: an operation of sending the compensated SST to the center station through the network interface device; and an operation of receiving traffic information from the terminal station in accordance with the corrected SST and a value counted from the initial counter value.

According to embodiments, in a TDMA-based VSAT satellite system using an on-board processing (OBP) satellite, even when network synchronization cannot be performed because a DVB-S2 signal of a center station cannot be received by an OBP satellite station, synchronization between the center station/terminal and satellite station is achieved.

In particular, an OBP satellite station is able to accurately correct and set superframe start timing (SST) and therefore demodulate a traffic signal from a terminal station, thereby achieving smooth communication.

DETAILED DESCRIPTION

In the following detailed description, only certain embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification, when a part is referred to "include" a certain element, it means that it may further include other elements rather than exclude other elements, unless specifically indicated otherwise.

In the description, expressions described in the singular in this specification may be interpreted as the singular or plural unless an explicit expression, such as "one" or "single" is used.

Terms, such as first, second, and the like may be used to describe various components and the components should not be limited by the terms. The terms are used only to discriminate one constituent element from another component. For example, a first component may be referred to as a second component, and similarly, the second component may be referred to as the first component without departing from the scope of the present disclosure.

Hereinafter, a method and apparatus for network synchronization in a satellite communication system according to an embodiment of the present disclosure will be described with reference to the drawings.

Figure 1:
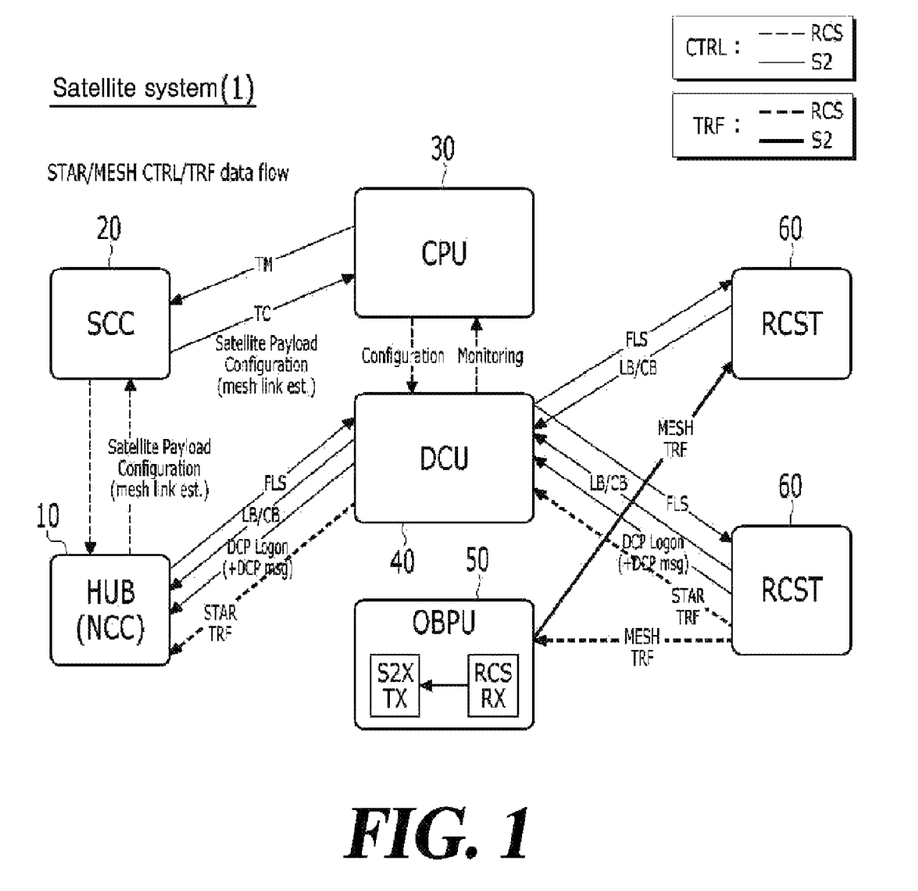
FIG. 1 is a view showing a structure of a satellite system according to an embodiment of the present disclosure.

FIG. 1 is a view showing a structure of a satellite system according to an embodiment of the present disclosure.

A satellite system 1 according to an embodiment of the present disclosure is a digital satellite system, as shown in the accompanying FIG. 1, and includes a Satellite Control Center (SCC) 10, a Network Control Center (NCC) 20, a Central Processing Unit (CPU) 30, a Digital Channelizer Unit (DCU) 40, an On-board processing unit (OBPU) 50, and a Return Channel Satellite Terminal (RCST) 60.

Such a satellite system 1 is a Multi Frequency-Time Division Multiple Access (TDMA)-based Very Small Aperture Terminal (VSAT) satellite system, and Digital Video Broadcasting-Satellite-Second Generation (DVB-S2)-based time division multiplexing (TDM) is used for forward link, and digital video broadcasting-return channel by satellite (DVB-RCS)-based Multi Frequency-Time Division Multiple Access (MF-TDMA) is used for reverse link, thereby supporting a bidirectional Adaptive Coding and Modulation (ACM) function. Also, a mesh network for direct communication between a star network and terminal stations may be configured for communication between a center station and terminal stations.

The SCC 10 is a sub system that sends and receives satellite payload configuration information from NCC (HUB) 20 to and from a satellite station via a TM/TC (Tele-Metering/Tele-Control) channel.

The NCC (HUB) 20 functions as a center station, and performs a function of controlling a ground terminal station by setting payload configuration in the OBPU 50 through the SCC 10 and sending a Forward Link Signaling (FLS) and Network Clock reference (NCR) signal via a forward link (DVB-S2). A DVB-S2 link from the center station to a terminal station is used as the forward link.

The CPU 30 performs control of the DCU 40 based on satellite payload configuration information from the SCC 10 received through a TM channel, and receives a monitoring result from the DCU 40. The DCU 40 is a satellite digital channelizer unit, and is configured to process a forward link (DVB-S2), a return link (DVB-RCS2) Logon Burst (LB)/Control Burst (CB) in a transparent manner. The return link is a DVB-RCS2 link in a direction from the terminal station to the center station.

The OBPU 50 is configured to perform a function of demodulating a return link (DVB-RCS2) Traffic Burst (TB) signal and modulating it into a DVB-S2 signal and transmitting it. The OBPU 50 is an on-board processing (OBP)-based satellite station, and may remove uplink channel loss by recovering a signal received from the ground and increase the utilization, transmission efficiency, and capacity of the satellite by separating an uplink and a downlink through digital signal processing.

Meanwhile, the RCST 60 functions as a terminal station.

A satellite system 1 including such a structure operates based on Time division multiple access (TDMA), and reference time synchronization needs to be performed among a center station, a satellite station, and a terminal station to receive TDMA Bursts.

The NCC 20 which is a center station generates a network clock reference (NCR) signal and processes it into a DVB-S2 signal and transmits it, and the RCST 60 which is a ground terminal station demodulates the DVB-S2 signal to obtain an NCR signal and sets a clock in accordance with the NCR of the center station which is obtained through an NCR recovery function.

In this case, however, the OBPU 50 which is an OBP satellite station is not able to perform NCR recovery because it has no DVB-S2 reception function. Accordingly, no synchronization is performed among the satellite station, the center station, and the ground terminal station.

Meanwhile, in a case where the NCC 20 which is a center station generates an FLS signal and processes it into a DVB-S2 signal and transmits it, the RCST 60 which is a terminal station obtains FLS by demodulating the DVB-S2 signal, adjusts frame timing in accordance with the FLS, transmits a TB to perform initial access, and afterwards performs fine synchronization by transmitting a CB and receiving a Component Mapping Table (CMT).

In this case, however, the OBPU 50 which is an OBP satellite station has no channel, that is, a DVB-S2 demodulator through which to receive FLS from the center station, so no synchronization is performed between the satellite station, the center station, and the ground terminal station.

In an embodiment of the present disclosure, the OBP satellite station cannot receive a DVB-S2 signal from the center station and therefore cannot perform DMA-based VSAT system network synchronization. Thus, the following method for performing network synchronization is provided.

Network synchronization is performed by setting a superframe start timing (SST) for TDMA.

Figure 2:
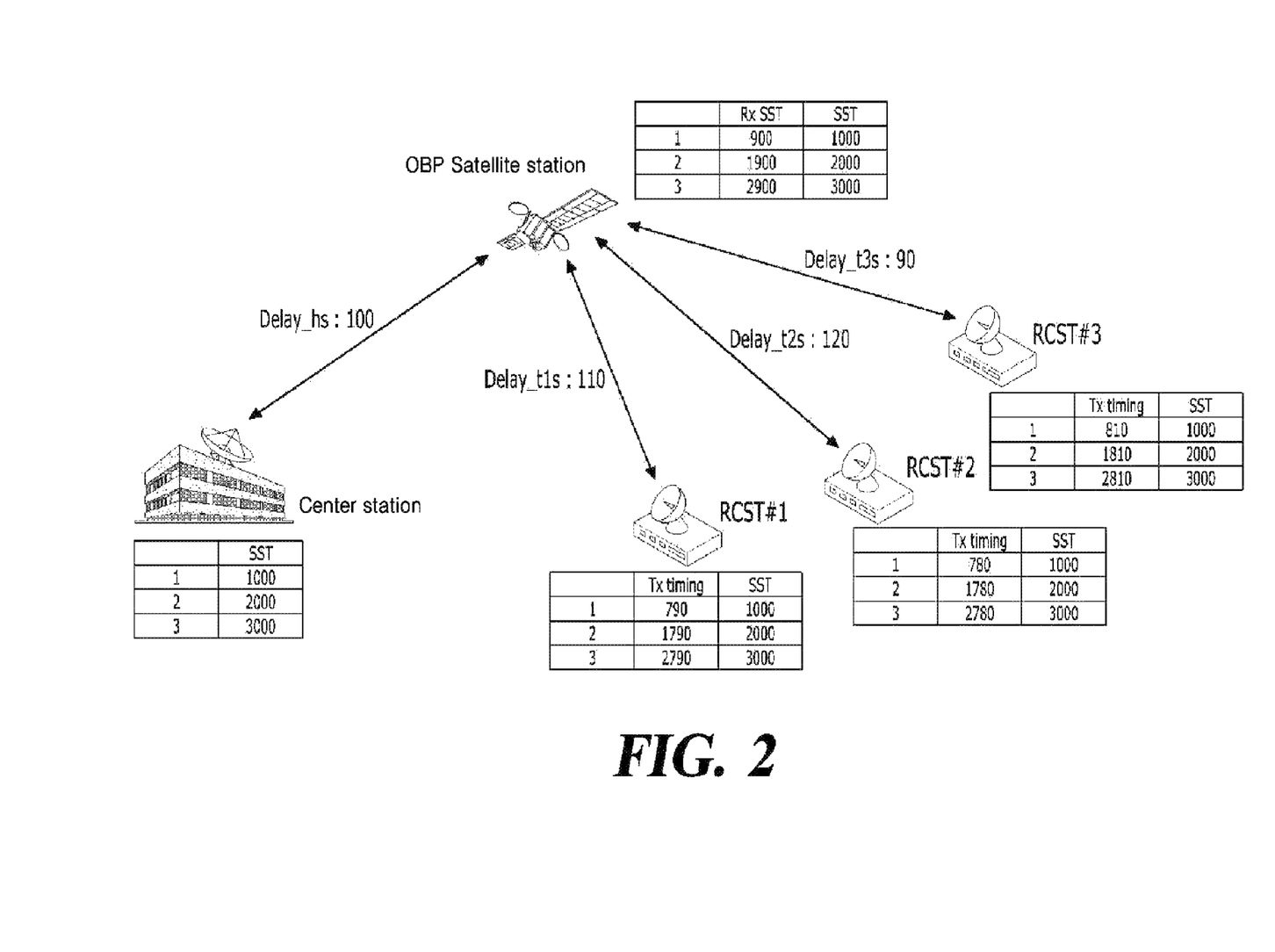
FIG. 2 is an exemplary view showing how a superframe start timing (SST) for TDMA is set according to an embodiment of the present disclosure.

FIG. 2 is an exemplary view showing how a superframe start timing (SST) for TDMA is set according to an embodiment of the present disclosure.

The center station generates a superframe start time (SST), inserts it into a table and sends it to a terminal station by using a network synchronization signal and coordinated universal time, and the SST may be set as exemplified, for example, in the table of FIG. 2.

While the upward link (DVB-S2) and the return link (DVB-RCS2) LB/CB burst are processed in a transparent manner, the terminal station receives FLS from the center station and performs NCR recovery, and the terminal station sends a CB and receives a CMT and corrects timing error and maintains fine synchronization between the center station and terminals.

Under this environment, even if the propagation support time varies with the location of the terminal station, a signal (RCS2 signal) sent by the terminal station can be received by setting a SST received by the satellite station as time obtained by subtracting a delay time (Delay_hs) between the center station and the satellite station from a SST generated by the center station.

Accordingly, as long as the OBP satellite station is able to accurately set a received SST, even if it does not receive a forward link signal (DVB-S2), it may receive a return link signal (DVB-RCS2) from the terminal station and demodulate it.

To this end, the following two types of synchronization need to be performed accurately.

Firstly, delay synchronization between the center station and the satellite station needs to be achieved.

However, even if the locations of the center station and the satellite station are set and the delay times are calculated, it is difficult to reflect perfect delay time in accordance with the vertical and lateral movements of the satellite station, and there is a need for a means for compensating for such error.

Secondly, clock synchronization between the center station and the satellite station needs to be achieved.

However, the clocks of the center station and the satellite station are not synchronized through NCR recovery. Thus, more and more clock drifts are generated no matter how accurate a clock oscillator is used.

In the embodiment of the present disclosure, there is provided a method for performing delay time synchronization between the center station and the satellite station and clock synchronization between the center station and the satellite station, based on the above-mentioned considerations.

To perform delay time synchronization between the center station and the satellite station, in the embodiment of the present disclosure, the center station sends variable SST (vSST) and an initial counter value to the satellite station. Here, the vSST is a SST generated by the center station, and, in the embodiment of the present disclosure, it is called a vSST since its value is changed by correction.

Also, a terminal station functioning as a reference terminal sends a TB for fine synchronization of the value of the vSST, and, upon receiving the TB, the satellite station corrects the vSST and sends the corrected vSST and a signal (Fine_sync_lock) to the satellite station.

Meanwhile, to perform clock synchronization between the center station and the satellite station, the satellite station periodically sets the initial value of the clock counter. As an example, the center station determines a stamping cycle in accordance with the specification of a data processing equipment (DPE) clock. Once the center station periodically sends the initial counter value in accordance with the stamping cycle, the satellite station may periodically set the initial clock counter value based on the received initial counter value and the stamping cycle. The stamping cycle also may be referred to as an update cycle, and the update cycle may vary with the performance of oscillators of the center station and the satellite station.

In the embodiment of the present disclosure, vSST may be corrected as follows.

$$vSST_i = vSST_{i-1} + vSST\_correction + SFD_{tick} \quad (1)-$$

Here, vSSTi is a corrected vSST, specifically a vSST obtained by putting a vSST compensation value of the OBP satellite station into a previous vSST. vSSTi-1 is the previous vSST. vSST_correction is the vSST compensation value from the OBP satellite station, and SFDtick is Superframe Duration clock tick. SFDtick may be a value obtained by calculating a superframe cycle with a 27 MHz clock. For example, given that a first SF start time is 0 and SFDtick is 1000, the start time of the next frame is 1000, and the start time of the frame after the next is set to 2000.

Here, vSST_correction which is the vSST compensation value is a value obtained by subtracting a preset half guard time (HGT) from a timing offset of a TB sent from the reference terminal.

Figure 3:
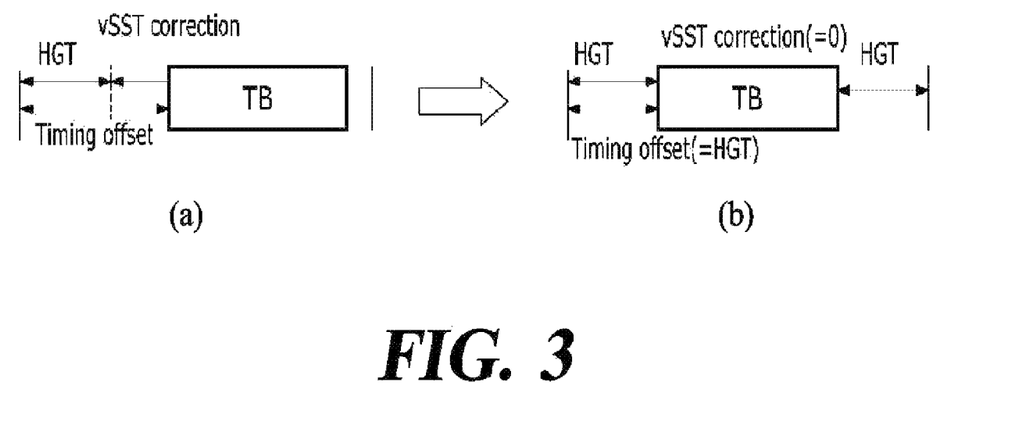
FIG. 3 is an exemplary view showing a vSST compensation process according to an embodiment of the present disclosure.

FIG. 3 is an exemplary view showing a vSST compensation process according to an embodiment of the present disclosure.

A timing offset of a TB received from a terminal station is estimated. As illustrated in (a) of the accompanying FIG. 3, HGT may be included in the timing offset.

In this state, as in (b) of FIG. 3, vSST_correction which is a vSST compensation value is obtained by subtracting HGT from the timing offset. In this case, vSST_correction is "0" since timing offset=HGT.

The satellite station may obtain a corrected vSST (vSSTi) by applying vSST_correction which is the vSST compensation value to Equation 1, and receive a traffic signal (RCS2 signal) sent by the terminal station at a time corresponding to the corrected vSST. Thus, the traffic signal sent by the terminal station may be received by synchronization without a delay. Accordingly, even when network synchronization is not possible because a DVB-S2 signal from the center station cannot be received by the OBP satellite station, the OBP satellite station is able to accurately correct and set an SST, and therefore a return link signal (DVB-RCS2) which is a traffic signal from the terminal station may be received and demodulated.

Figure 4:
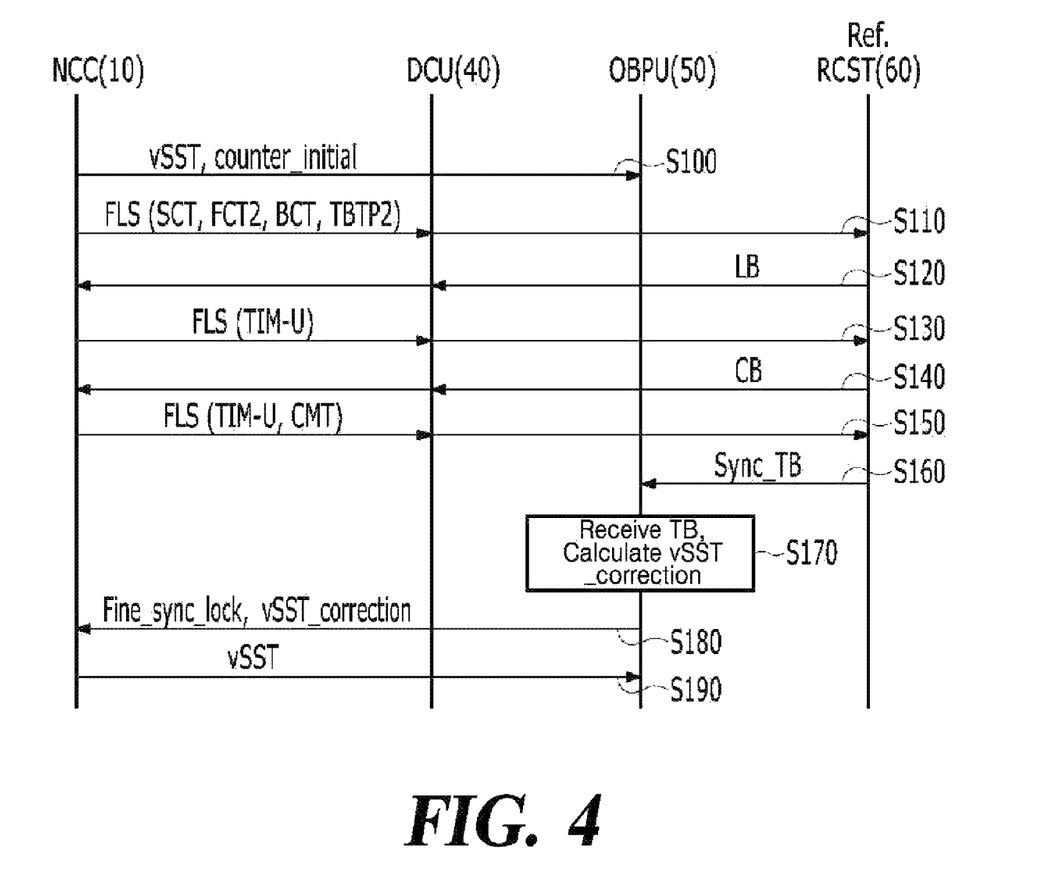
FIG. 4 is a flowchart of a network synchronization method according to an embodiment of the present disclosure.

FIG. 4 is a flowchart of a network synchronization method according to an embodiment of the present disclosure.

As in the accompanying FIG. 4, the NCC 10 which is a center station generates a vSST and sends the generated vSST and an initial counter value (counter_initial) to the OBPU 50 which is a satellite (S100). The NCC 10 may set an initial value of a counter for Network Clock Reference (NCR) by using a stable internal clock (e.g., GPS) and generate a vSST based on the initial value. The OBPU 50 which is a satellite station sets an initial value of a clock counter based on the received initial counter value (counter_initial) and operates the internal clock counter.

Afterwards, the NCC 10 may configure a vSST, a superframe, frame, and a burst based on the NCR counter and send Forward Link Signaling (FLS) information including this information to the terminal station (S110). The FLS information is sent to the terminal station through the DCU 40. The FLS information may include superframe composition table (SCT), frame composition table version 2 (FCT2), Broadcast Configuration Table (BCT), transmission burst time plan 2 (TBTP2). The SCT, the FCT2, and the BCT are tables defined on DVB-RCS2. Specifically, the SCT is a table in which superframe configuration information is defined, the FC2 is a table in which frame configuration information is defined, the BCT is a table in which configuration information for a waveform transmitted by the terminal is defined, and the TBTP2 is a table in which time slot information allocated to the terminal is defined.

Hereinafter, a Ref.RCST 60 functioning as a reference terminal station, among terminal stations, will be described by way of example for convenience of explanation.

The Ref.RCST 60 recovers a clock synchronized with the center station by performing NCR recovery by using data received from the center station, and operates the NCR counter inside the terminal in accordance with this clock. Also, the Ref.RCST 60 may receive configuration information for each vSST, superframe, frame, and burst through a received FLS, and may send an Logon Burst (LB) signal to the center station NCC 10 at a transmission time determined in accordance with SST and transmission delay information (S120).

The center station NCC 10 may estimate a timing error by demodulating the received LB signal and feed back the estimated timing error FLS(TIM_U) (S130).

Meanwhile, the Ref.RCST 60 may transition into a coarse sync state in accordance with the timing error that was fed back, and sends a Control Burst (CB) signal to the center station NCC 10 (S140). The center station NCC 10 may generate timing error information by correcting the timing error estimated in the step S130 based on the received CB signal. Then, it sends the timing error information FLS (TIM_U and CMT) to the terminal station (S150).

The Ref.RCST 60 which is a terminal station determines a transmission time at which traffic information is to be sent, based on a transmission delay difference according to the received timing error information, and the vSST, and sends traffic information Sync_TB to the OBPU 50 which is a satellite station at the determined transmission time (S160).

The OBPU 50 which is a satellite station receives the traffic information Sync_TB from the Ref.RCST 60, and obtains a corrected vSST based on the traffic information Sync_TB (S170). Specifically, a timing offset of the traffic information Sync_TB is estimated, a vSST compensation value is obtained by subtracting a preset HGT from the timing offset, and a corrected vSST (vSST_correction) is obtained according to Equation 1 by using SFDtick, the vSST compensation value, and the previous vSST.

Since the OBPU 50 which is a satellite station may receive a traffic signal (RCS2 signal) sent by the Ref.RCST 60 of the terminal station at a time corresponding to the corrected vSST, based on the internal counter value, the traffic signal transmitted by the terminal station may be received by synchronization without a delay.

Afterwards, the OBPU 50 which is a satellite station sends to the center station NCC 10 a signal (Fine_sync_lock) indicating synchronization with the corrected vSST (vSST_correction) (S180).

The center station NCC 10 sends the corrected vSST to the satellite station OBPU 50 (S190).

Figure 5:
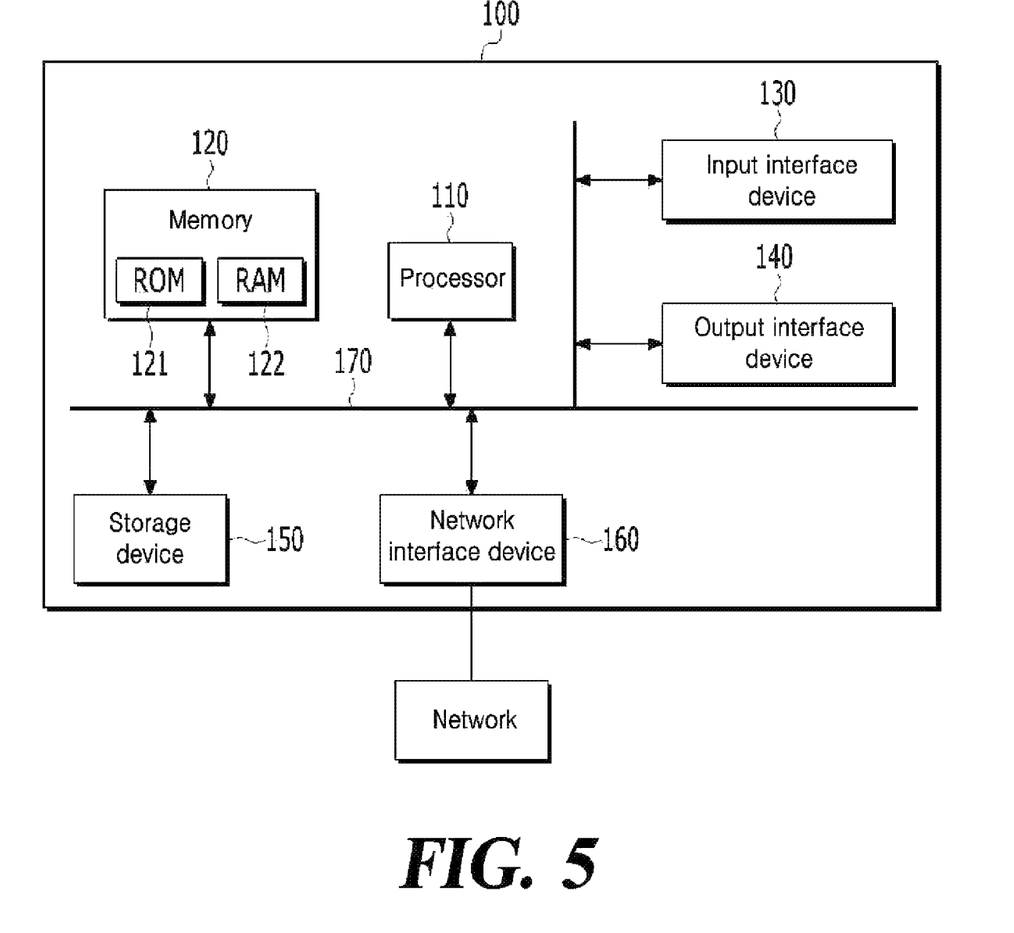
FIG. 5 is a structure diagram illustrating a computing apparatus for implementing a network synchronization method according to an embodiment of the present disclosure.

FIG. 5 is a structure diagram illustrating a computing apparatus for implementing a network synchronization method according to an embodiment of the present disclosure.

As illustrated in the accompanying FIG. 5, the network synchronization method according to the embodiment of the present disclosure may be implemented by using a computing apparatus 100.

The computing apparatus 100 may include at least one of a processor 110, a memory 120, an input interface device 130, an output interface device 140, a storage device 150, or a network interface device 160. Each of these components may be connected by a bus 170 and perform communication with each other. Also, each of these components may be connected via individual interfaces or individual buses around the processor 110, rather than via a common bus 170.

The processor 110 may be implemented as various types such as an Application Processor (AP), a Central Processing Unit (CPU), and a Graphic Processing Unit (GPU), and may be a certain semiconductor device that executes commands stored in the memory 120 or the storage device 150. The processor 110 may execute a program command stored in at least one of the memory 120 or the storage device 150. Such a processor 110 may be configured to implement the functions and methods explained based on the above FIGS. 1 to 4. For example, the processor 110 may be implemented to perform the functions of the OBPU.

The memory 120 and the storage device 150 may include various types of volatile or non-volatile storage media. For example, the memory may include read-only memory (ROM) 121 and random access memory (RAM) 122. In the embodiment of the present disclosure, the memory 120 may be positioned inside or outside the processor 110, and the memory 120 may be connected to the processor 110 through various well-known means.

The input interface device 130 is configured to provide data to the processor 110, and the output interface device 140 is configured to output data from the processor 110.

The network interface device 160 may send or receive signals to or from other devices over a wired network or a wireless network. For example, the network interface device 160 may be configured to send or receive signals to or from a terminal station.

The computing apparatus 100 having such a structure may be called a satellite station or a satellite apparatus, and may implement the network synchronization method according to the embodiment of the present disclosure.

Also, at least part of the network synchronization method according to the embodiment of the present disclosure may be implemented as a program or software executed on the computing apparatus 100, and the program or software may be stored in a computer-readable medium.

Also, at least part of the network synchronization method according to the embodiment of the present disclosure may be implemented as hardware that can be electrically connected to the computing apparatus 100.

The exemplary embodiment of the present disclosure is not implemented only by the aforementioned apparatus and/or method, and may be implemented through a program for executing a function corresponding to the configuration of the exemplary embodiment of the present disclosure, a recording medium in which the program is recorded, and the like, and such an implementation may be easily realized by those skilled in the art from the description of the aforementioned exemplary embodiment.

While the invention has been described with reference to exemplary embodiments thereof, one of ordinary skill in the art would understand that various changes in form and details may be made therein without departing from the idea and scope of the invention as defined by the claims and equivalents thereof.

What is claimed is:

1. A method for network synchronization in a satellite communication system, the method comprising:
   receiving, by a satellite station, a superframe start timing (SST) and an initial counter value from a center station;
   receiving, by the satellite station, traffic information sent from a terminal station at a time determined based on the SST; and
   generating, by the satellite station, a compensation value for the SST upon receiving the traffic information, and correcting the SST in accordance with the compensation value.

2. The method of claim 1, wherein the correcting of the SST includes obtaining the compensation value by using a timing offset corresponding to the traffic information and a preset half guard time (HGT).

3. The method of claim 1, wherein the correcting of the SST includes:
   estimating a timing offset corresponding to the traffic information;
   obtaining the compensation value by subtracting a preset half guard time (HGT) from an estimated timing offset; and
   correcting the SST in accordance with the compensation value.

4. The method of claim 3, wherein the correcting of the SST in accordance with the compensation value includes obtaining a corrected SST by adding the compensation value and $SFD_{tick}$ to the SST,
   wherein the $SFD_{tick}$ is a superframe duration clock tick.

5. The method of claim 1, further comprising sending, by the satellite station, the corrected SST to the center station.

6. The method of claim 1, further comprising receiving, by the satellite station, traffic information from the terminal station in accordance with a value counted from the initial counter value and the corrected SST.

7. The method of claim 1, wherein the satellite station periodically sets an initial clock counter value.

8. The method of claim 7, wherein a stamping cycle is determined in accordance with a specification of a data processing equipment (DPE) clock of the center station, and the initial clock counter value is periodically set in accordance with the stamping cycle.

9. The method of claim 1, wherein the traffic information is sent from the terminal station at a transmission time determined by using timing error information, which the terminal station receives from the center station, and the SST.

10. The method of claim 1, wherein the satellite system is a multi frequency-time division multiple access (TDMA)-based very small aperture terminal (VSAT) satellite communication system.

11. A satellite apparatus in a satellite communication system, comprising:
    a network interface device; and
    a processor,
    wherein the processor is configured to perform:
    an operation of receiving a superframe start timing (SST) and an initial counter value from a center station through the network interface device;
    an operation of receiving traffic information sent from a terminal station at a time determined based on the SST through the network interface device; and
    an operation of generating a compensation value for the SST upon receiving the traffic information, and correcting the SST in accordance with the compensation value.

12. The satellite apparatus of claim 11, wherein, in performing the operation of correcting the SST, the processor is configured to obtain the compensation value by using a timing offset corresponding to the traffic information and a preset half guard time (HGT).

13. The satellite apparatus of claim 11, wherein, in performing the operation of correcting the SST, the processor is configured to perform:
    an operation of estimating a timing offset corresponding to the traffic information;
    an operation of obtaining the compensation value by subtracting a preset HGT from an estimated timing offset; and
    an operation of correcting the SST in accordance with the compensation value.

14. The satellite apparatus of claim 13, wherein a corrected SST is obtained by adding the compensation value and $SFD_{tick}$ to the SST,
    wherein the $SFD_{tick}$ is a superframe duration clock tick.

15. The satellite apparatus of claim 11, wherein the processor is configured to additionally perform:
    an operation of sending the corrected SST to the center station through the network interface device; and
    an operation of receiving traffic information from the terminal station in accordance with a value counted from the initial counter value and the corrected SST.

* * * * *